US 11,401,995 B2

(12) United States Patent
Ishibashi et al.

(10) Patent No.: US 11,401,995 B2
(45) Date of Patent: Aug. 2, 2022

(54) TORSIONAL VIBRATION DAMPER AND MANUFACTURING METHOD THEREOF

(71) Applicants: TOYOTA JIDOSHA KABUSHIKI KAISHA, Toyota (JP); AISIN AW CO., LTD., Anjo (JP); AISIN FUKUI Corporation, Echizen (JP)

(72) Inventors: Masayuki Ishibashi, Numazu (JP); Hideyuki Nishida, Sunto-gun (JP); Yoichi Oi, Anjo (JP); Takuya Yoshikawa, Fukui (JP); Katsunori Tanaka, Fukui (JP); Tomoyuki Hiramoto, Sabae (JP)

(73) Assignees: TOYOTA JIDOSHA KABUSHIKI KAISHA, Toyota (JP); AISIN AW CO., LTD., Anjo (JP); AISIN FUKUI Corporation, Echizen (JP)

( * ) Notice: Subject to any disclaimer, the term of this patent is extended or adjusted under 35 U.S.C. 154(b) by 215 days.

(21) Appl. No.: 16/858,939

(22) Filed: Apr. 27, 2020

(65) Prior Publication Data

US 2020/0355252 A1    Nov. 12, 2020

(30) Foreign Application Priority Data

May 7, 2019    (JP) .............................. JP2019-087774

(51) Int. Cl.
*F16F 15/121*    (2006.01)
*F16F 15/131*    (2006.01)
*F16F 15/134*    (2006.01)

(52) U.S. Cl.
CPC .... *F16F 15/13157* (2013.01); *F16F 15/1213* (2013.01); *F16F 15/1216* (2013.01); *F16F 15/134* (2013.01)

(58) Field of Classification Search
CPC .............. F16F 15/1206; F16F 15/1213; F16F 15/1216; F16F 15/13157; F16F 15/134; B23F 1/00; B23F 17/00
USPC ............................................... 409/1, 10, 141
See application file for complete search history.

(56) References Cited

U.S. PATENT DOCUMENTS

| | | | |
|---|---|---|---|
| 3,417,510 A * | 12/1968 | Wildhaber ............ | B23F 19/002 409/42 |
| 5,863,274 A * | 1/1999 | Jackel ............... | F16F 15/13157 475/346 |
| 6,398,655 B1 * | 6/2002 | Orlamunder ............ | F16F 15/22 464/68.1 |
| 8,961,346 B2 * | 2/2015 | Murakami .............. | F16H 45/02 475/71 |
| 10,718,401 B2 * | 7/2020 | Yoshikawa ........... | F16F 15/134 |

(Continued)

FOREIGN PATENT DOCUMENTS

WO    2016/208765 A1    12/2016

*Primary Examiner* — Thomas W Irvin
(74) *Attorney, Agent, or Firm* — Oliff PLC (57) ABSTRACT

A torsional vibration damper that a torsional vibration damper having a planetary gear unit, and a manufacturing method of the torsional vibration damper for limiting damages on gears of the planetary gear unit due to dimension errors. In the planetary gear unit, at least one of a sun gear, a ring gear, and a set of planetary gears is/are formed by a press forming method. The gear formed by the press forming method is engaged with the remaining gears in such a manner that a thinner portion of each tooth is individually engaged with a thicker portion of the adjacent teeth of the remaining gears.

8 Claims, 11 Drawing Sheets

(56) References Cited

U.S. PATENT DOCUMENTS

| | | | |
|---|---|---|---|
| 10,962,085 B2* | 3/2021 | Nakamura | F16F 15/1343 |
| 10,968,977 B2* | 4/2021 | Ishibashi | F16F 15/1206 |
| 2018/0149232 A1 | 5/2018 | Yoshikawa et al. | |
| 2018/0187743 A1* | 7/2018 | Yoshikawa | F16H 41/24 |
| 2021/0187642 A1* | 6/2021 | Schieke | B23F 19/05 |

* cited by examiner

TORSIONAL VIBRATION DAMPER AND MANUFACTURING METHOD THEREOF

CROSS REFERENCE TO RELATED APPLICATION

The present disclosure claims the benefit of Japanese Patent Application No. 2019-087774 filed on May 7, 2019 with the Japanese Patent Office, the disclosure of which is incorporated herein by reference in its entirety.

BACKGROUND

Field of the Disclosure

Embodiments of the present disclosure relate to the art of a torsional vibration damper that suppresses torsional vibrations resulting from torque pulse, and a manufacturing method thereof.

Discussion of the Related Art

WO 2016/208765 A1 describes an example of a damper device having a planetary gear unit for suppressing torsional vibrations resulting from torque pulse. In the damper device taught by WO 2016/208765 A1, the planetary gear unit is arranged in a torque converter having a lock-up clutch around a spring damper. In the planetary gear unit, a carrier is connected to the lockup clutch and a drive member of the spring damper so that a torque of an engine is applied to the carrier through the lock-up clutch, and a sun gear is connected to a driven member of the spring damper. An intermediate member is disposed between the drive member and the driven member. Specifically, the intermediate member is connected to the drive member through a first elastic body, and is connected to the driven member through a second elastic body. A plurality of pinion gears is attached to the carrier in such a manner that a clearance between the intermediate member and one of the pinion gears in a direction that the intermediated member is oscillated by an engine torque is increased wider than a clearance between the intermediate member and the other one of the pinion gears of the opposite side. The carrier and the sun gear are oscillated relatively to each other within a predetermined degree by pulsation of the engine torque while compressing the first elastic body and the second elastic body. As a result, the ring gear is oscillated compulsory by the first elastic body and the second elastic body thus compressed and expanded repeatedly with different phase from the pulsations of the engine torque. An inertia torque of the ring gear thus oscillated acts as a vibration suppressing torque to damp pulsation of output torque from the planetary gear unit.

Thus, in the damper device described in WO 2016/208765 A1, the first elastic body and the second elastic body are connected in series to allow the spring damper to be oscillated widely by the engine torque. According to the teachings of WO 2016/208765 A1, therefore, an antiresonance point may be lowered by reducing a synthesized spring constant of the spring damper to enhance vibration damping performance of the damper device within a low speed range of the engine. However, vibration damping performance and durability of the damper device of this kind may be reduced by a dimension error in the planetary gear unit caused during a manufacturing process.

If teeth of the gears of the planetary gear unit are shaped by a conventional cutout method, a manufacturing cost and a manufacturing time of the planetary gear unit will be increased. Instead, in order to reduce the manufacturing cost and the manufacturing time, the gears of the planetary gear unit may also be manufactured by a press working. In this case, however, an edge of each tooth of the gear as a workpiece of a punch side may be plastically deformed into a so-called "rollover surface" or "droop surface". Consequently, a circular thickness of the tooth of the finished gear in the punch side may be thinner than that of a die side. For this reason, after assembling the planetary gear unit using the gears manufactured by the press working or a stamping, a set of teeth of the gear may be contacted unevenly to a set of teeth of the gear mating therewith. As a result, the gears of the planetary gear unit may be damaged, and the vibration damping performance of the damper device having the planetary gear unit may be reduced. In the case of manufacturing the gear by the press working, it is preferable to apply a tooth crowing. However, the manufacturing cost and the manufacturing time of the planetary gear unit will be increased by the tooth crowing.

SUMMARY

The present disclosure has been conceived noting the above-described technical problems, and it is therefore an object of the present disclosure to provide a torsional vibration damper having a planetary gear unit, and a manufacturing method of the torsional vibration damper for limiting damages on gears of the planetary gear unit due to dimension error of gears.

According to one aspect of the present disclosure, there is provided a torsional vibration damper comprising a planetary gear unit including: a sun gear; a ring gear arranged concentrically around the sun gear; a plurality of planetary pinion gears interposed between the sun gear and the ring gear to transmit a torque to at least one of the sun gear and the ring gear; and a carrier supporting the pinion gears in a rotatable manner. In the planetary gear unit: one of the sun gear, the ring gear, and the carrier serves as an input element to which a torque is delivered from an engine; another one of the sun gear, the ring gear, and the carrier serves as an output element that outputs the torque; and still another one of the sun gear, the ring gear, and the carrier serves as an inertia element that rotates relatively to the input element and the output element. The input element and the output element are connected to each other through an elastic member so that the input element and the output element are rotated relatively to each other while deforming the elastic member by a pulsation of the torque of the engine, and the inertia element is also oscillated by the pulsation of the torque of the engine. A thickness of each tooth of each of the sun gear, the ring gear, and the planetary pinion gears is varied respectively in a direction of face width, and the sun gear, the ring gear, and the planetary pinion gears are engaged to one another so that a thinner portion of each tooth is individually engaged with a thicker portion of the adjacent teeth.

In a non-limiting embodiment, at least one of the sun gear, the ring gear, and the planetary pinion gears may be formed by a press forming method.

In a non-limiting embodiment, at least the planetary pinion gears may be formed by the press forming method.

In a non-limiting embodiment, at least the sun gear may be formed by the press forming method.

In a non-limiting embodiment, at least the ring gear may be formed by the press forming method.

In a non-limiting embodiment, the sun gear, the ring gear, and the planetary pinion gears may be formed by the press forming method.

According to another aspect of the present disclosure, there is provided a manufacturing method of a torsional vibration damper comprising a planetary gear unit including: a sun gear; a ring gear arranged concentrically around the sun gear; a plurality of planetary pinion gears interposed between the sun gear and the ring gear to transmit a torque to at least one of the sun gear and the ring gear; and a carrier supporting the pinion gears in a rotatable manner. In the planetary gear unit: one of the sun gear, the ring gear, and the carrier serves as an input element to which a torque is delivered from an engine; another one of the sun gear, the ring gear, and the carrier serves as an output element that outputs the torque; and still another one of the sun gear, the ring gear, and the carrier serves as an inertia element that rotates relatively to the input element and the output element. The input element and the output element are rotated relatively to each other while deforming an elastic member interposed therebetween by a pulsation of the torque of the engine, and the inertia element is oscillated by the pulsation of the torque of the engine. The manufacturing method comprising: forming at least one of the sun gear, the ring gear, and the planetary pinion gears by a press forming method in which a forming tool is moved in a direction of face width; forming the remaining gear(s) such that each tooth is thinned toward one side of the gear(s); and thereafter engaging the gear formed by the press forming method with the remaining gear(s) such that a thinner portion of each tooth is individually contacted to a thicker portion of adjacent teeth of the remaining gear(s).

In a non-limiting embodiment, the remaining gear(s) may be formed by a cutout method.

Thus, according to the exemplary embodiments of the present disclosure, the sun gear, the ring gear, and the planetary pinion gears are engaged to one another in such a manner that that the thinner portion of each tooth is individually engaged with the thicker portion of the adjacent teeth. According to the exemplary embodiments of the present disclosure, therefore, each tooth of the gears can be contacted homogeneously to the adjacent teeth in the assembled planetary gear unit. For this reason, damages on the sun gear, the ring gear, and the pinion gears can be limited.

In addition, according to the exemplary embodiments of the present disclosure, at least one of the sun gear, the ring gear, and a set of the planetary pinion gears is formed by the press forming method. According to the exemplary embodiments of the present disclosure, therefore, a manufacturing cost and a manufacturing time of the planetary gear unit can be reduced compared to a case of forming the gear by the cutout method. That is, a man-hour to manufacture the planetary gear unit can be reduced. In addition, since each tooth of the gears can be contacted homogeneously to the adjacent teeth, a damage on the planetary gear unit can be limited. Further, vibration damping performance of the torsional vibration damper can be ensured.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

First Example

Figure 1:
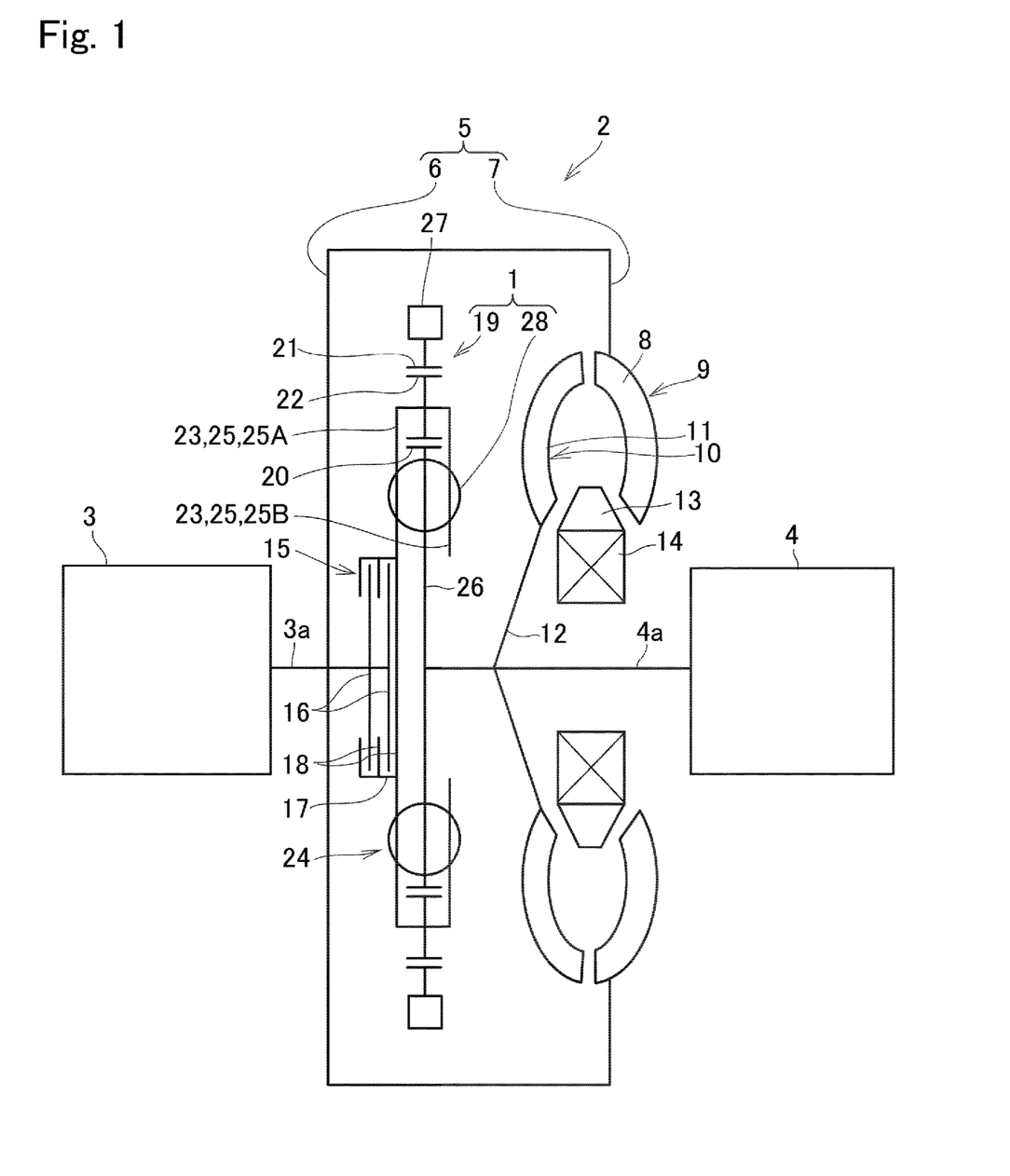
FIG. 1 is a schematic illustration showing a structure of a torsional vibration damper according to the exemplary embodiment of the present disclosure.

Examples of the present disclosure will now be explained with reference to the accompanying drawings. Turning now to FIG. 1, there is shown a structure of the torsional vibration damper 1 according to the exemplary embodiment of the present disclosure arranged in a torque converter 2. As illustrated in FIG. 1, in the torque converter 2, the torsional vibration damper 1 is disposed on a torque transmission path between a prime mover 3 and a drive object so that a torque generated by the prime mover 3 is delivered to the drive object 4 through the torsional vibration damper 1. For example, an internal combustion engine such as a gasoline engine and a diesel engine may be adopted as the prime mover (as will be called the "engine" hereinafter) 3, and an output torque of the engine 3 pulsates inevitably. A torque of the engine 3 is increased with an increase in a speed of the engine 3, but reduced after the speed of the engine 3 is increased higher than a speed at which the torque of the engine 3 is increased to a maximum torque. The pulsation of the torque of the engine 3 is reduced with an increase in the speed of the engine 3. For example, the drive object (as will be called the "transmission" hereinafter) 4 may be a conventional transmission such as a geared transmission in which a speed ratio changes stepwise, and a continuously variable transmission in which a speed ratio changes continuously.

An internal space of the torque converter 2 is maintained in a liquid-tight condition by a housing 5 including a front cover 6 connected to an output shaft 3a of the engine 3, and a pump shell 7 joined to the front cover 6.

In order to transmit torque, fluid (e.g., oil) is encapsulated in the housing 5 of the torque converter 2. A plurality of pump blades 8 are attached to an inner surface of the pump shell 7 to form a pump impeller 9. A turbine runner 10 that is substantially symmetrical with the pump impeller 9 is opposed to the pump impeller 9 to be rotated by a spiral flow of the oil created by the pump impeller 9. Specifically, the turbine runner 10 comprises a turbine shell (not shown), and a plurality of turbine blades 11 attached to an inner surface of the turbine shell. The turbine runner 10 is connected to an input shaft 4a of the transmission 4 through a turbine hub 12.

A stator 13 is interposed between the pump impeller 9 and the turbine runner 10 while being attached to a predetermined fixed shaft (not shown) through a one-way clutch 14. When a speed difference between the pump impeller 9 and the turbine runner 10 is small, the oil flowing out of the turbine runner 10 is delivered to the pump impeller 9 while changing a flowing direction. By contrast, when the speed difference between the pump impeller 9 and the turbine runner 10 is large, the oil flowing out of the turbine runner 10 is delivered to the pump impeller 9 without changing the flowing direction to rotate the pump impeller 9. To this end, when a speed difference between the pump impeller 9 and the turbine runner 10 is small, a rotation of the stator 13 is stopped by engaging the one-way clutch 14. By contrast, when a speed difference between the pump impeller 9 and the turbine runner 10 is large, the stator 13 is allowed to rotate by disengaging the one-way clutch 14.

A lockup clutch 15 is opposed to an inner surface of the front cover 6. The lockup clutch 15 is a multiple-plate clutch comprising: a plurality of clutch discs 16 splined to a clutch hub (not shown) joined to the front cover 6; and a plurality of clutch plates 18 splined to an inner surface of a clutch drum 17 covering an outer circumference of the clutch hub. Specifically, the clutch discs 16 and the clutch plates 18 are arranged alternately between a lockup piston (not shown) and a snap ring (not shown) attached to the clutch drum 17. The clutch discs 16 and the clutch plates 18 are clamped to be frictionally contacted to one another between the lockup piston and the snap ring by advancing the lockup piston. As a result, the lockup clutch 15 is brought into engagement to transmit torque between the clutch discs 16 and the clutch plates 18. Although not especially shown in FIG. 1, a return spring is arranged radially inner side of the lockup clutch 15 while being overlapped with the lockup clutch 15 at least partially. The return springs pushes the lockup piston in a direction to isolate the clutch discs 16 and the clutch plates 18 from each other, that is, in a direction to disengage the lockup clutch 15.

The torsional vibration damper 1 is arranged adjacent to the lockup clutch 15 in an axial direction of the torque converter 2. The torsional vibration damper 1 comprises a planetary gear unit and a plurality of elastic members. The planetary gear unit is adopted to perform a differential action among three rotary elements, and according to the exemplary embodiment of the present disclosure, a single-pinion planetary gear unit 19 is employed as the planetary gear unit. The planetary gear unit 19 comprises: a sun gear 20; a ring gear 21 arranged concentrically around the sun gear 20; and a carrier 23 supporting a plurality of pinion gears 22 interposed between the sun gear 20 and the ring gear 21 in a rotatable manner.

The clutch drum 17 of the lockup clutch 15 is connected to the carrier 23 to serve as an input element. The carrier 23 also serve as a drive plate 25 of a spring damper 24, and the sun gear 20 is formed on an outer circumference of a driven plate 26 of the spring damper 24 to serve as an output element. An inertia body 27 is arranged around the ring gear 21. The inertia body 27 may be formed not only integrally with the ring gear 21 but also formed separately from the ring gear 21. Given that the inertia body 27 is formed separately from the ring gear 21, the inertia body 27 is attached to an outer circumferential portion of the ring gear 21 to be rotated integrally therewith. Accordingly, the ring gear 21 and the inertia body 27 serve as an inertia element of the exemplary embodiment of the present disclosure.

The spring damper 24 is arranged concentrically inside of the planetary gear unit 19 while being overlapped with the planetary gear unit 19 at least partially in the radial direction. The drive plate 25 is arranged upstream of the spring damper 24 in a torque transmitting direction, and according to the exemplary embodiment of the present disclosure, the drive plate 25 comprises an annular first drive plate 25A, and an annular second drive plate 25B. Specifically, the first drive plate 25A is disposed closer to the lockup clutch 15 than the second drive plate 25B in the axial direction.

The first drive plate 25A and the second drive plate 25B are joined to each other through predetermined connection means such as rivets or bolts to be rotated integrally while keeping a predetermined clearance therebetween in the axial direction. Specifically, the first drive plate 25A and the second drive plate 25B are joined to each other by a plurality of the connection means on both sides of each of the pinion gears 22 of the planetary gear unit 19 in the circumferential direction at a radially same level as the pinion gears 22. That is, each of the pinion gears 22 is situated between the connection means 35 while keeping predetermined clearances in the circumferential direction to the connection means on both sides. Thus, the first drive plate 25A and the second drive plate 25B serve as the carrier 23 of the planetary gear unit 19.

Figure 2:
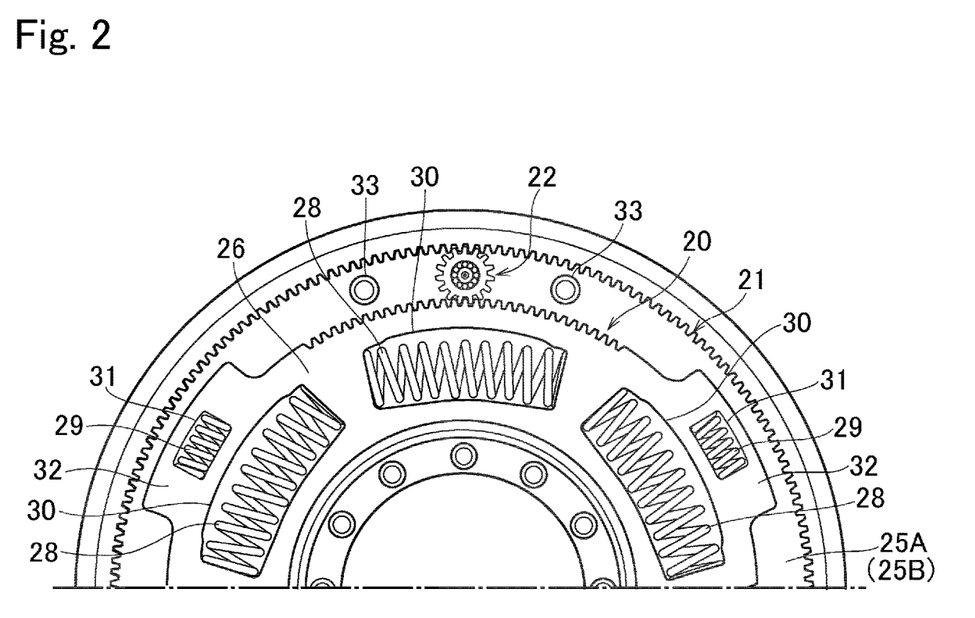
FIG. 2 is a partial front view showing a structure of the torsional vibration damper according to the exemplary embodiment of the present disclosure.

As illustrated in FIGS. 1 and 2, a driven plate 26 is interposed between the first drive plate 25A and the second drive plate 25B. Specifically, the driven plate 26 is connected to the first drive plate 25A and the second drive plate 25B through a plurality of first springs 28 and a plurality of second springs 29 so that the drive plate 25 and the driven plate 26 rotate relatively to each other within a predetermined degree. Accordingly, the first spring 28 and the second spring 29 serve as an elastic member of the examples of the present disclosure. A spring coefficient of each of the second springs 29 is individually larger than a spring coefficient of each of the first springs 28. Therefore, between the first drive plate 25A and the second drive plate 25B, the second springs 29 are compressed after the first springs 28 are compressed.

FIG. 2 is a partial front view showing a structure of the torsional vibration damper 1 according to the exemplary embodiment in more detail. The driven plate 26 is a disc member that is diametrically smaller than the first drive plate 25A and the second drive plate 25B. A plurality of first apertures 30 are formed in the driven plate 26 at regular intervals in the circumferential direction, and a plurality of second apertures 31 are formed radially outer side of the first apertures 30 at regular intervals in the circumferential direction. On the other hand, in the first drive plate 25A, a plurality of radially inner apertures (not shown) each of which has substantially same dimensions as the first apertures 30 of the driven plate 26 are formed at a radially same level and at same intervals in the circumferential direction as the first apertures 30, and a plurality of radially outer apertures (not shown) each of which is longer than the second apertures 31 of the driven plate 26 in the circumferential direction are formed at a radially same level and at same intervals in the circumferential direction as the second apertures 31. Likewise, in the second drive plate 25B, a plurality of radially inner apertures (not shown) each of which has substantially same dimensions as the first apertures 30 of the driven plate 26 are formed at a radially same level and at same intervals in the circumferential direction as the first apertures 30, and a plurality of radially outer apertures (not shown) each of which is longer than the second apertures 31 of the driven plate 26 in the circumferential direction are formed at a radially same level and at same intervals in the circumferential direction as the second apertures 31.

The first apertures 30 of the driven plate 26 are individually overlapped with the radially inner apertures of the first drive plate 25A and the radially inner apertures 30 of the second drive plate 25B to form spring holders, and the first spring 28 is held in each of the spring holders thus formed. Likewise, the second apertures 31 of the driven plate 26 are individually overlapped with the radially outer apertures of the first drive plate 25A and the radially outer apertures 30 of the second drive plate 25B to form spring holders, and the second spring 29 is held in each of the spring holders thus formed. When the drive plate 25 and the driven plate 26 are rotated relatively to each other while compressing the first springs 28 to a certain extent, one of circumferential ends of the spring holder formed of the radially outer apertures of the first drive plate 25A and the second drive plate 25B comes into contact to the second spring 29 held in the second aperture 31 of the driven plate 26 thereby compressing the second spring 29.

Figure 3:
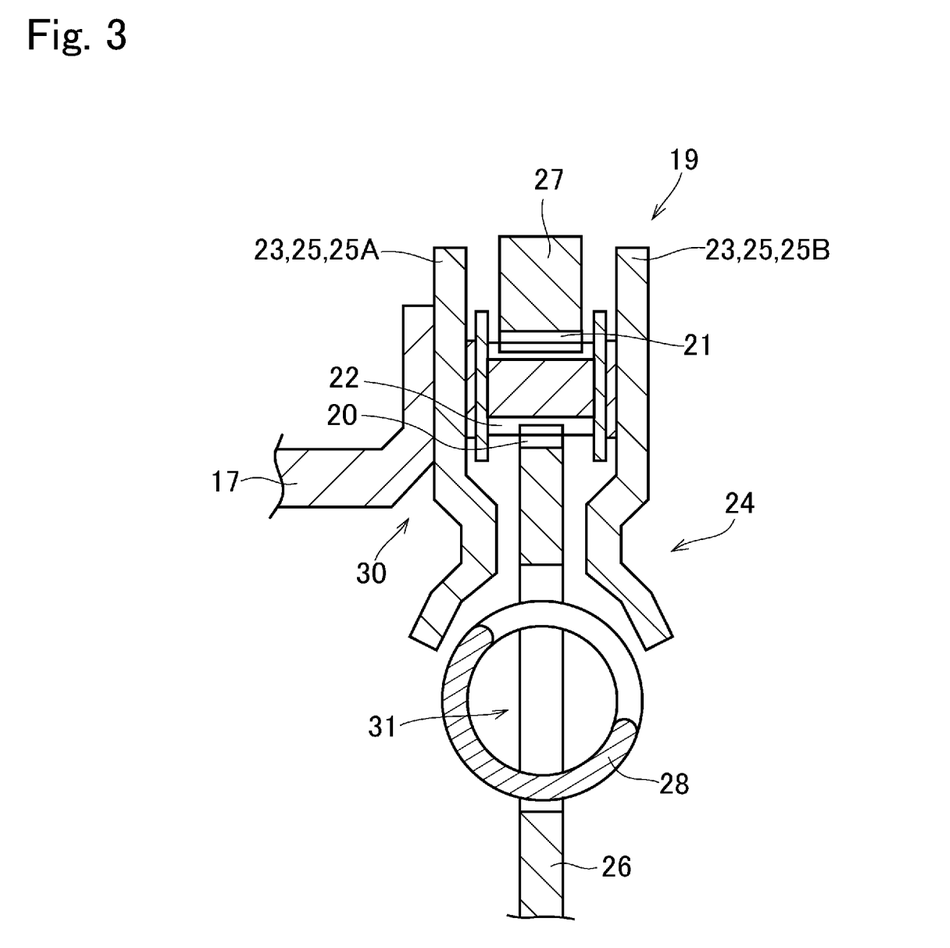
FIG. 3 is a partial cross-sectional view showing a part of the torsional vibration damper in an enlarged scale.

A plurality of protrusions 32 are formed on an outer circumference of the driven plate 26 to protrude radially outwardly at regular intervals in the circumferential direction. When an angle of relative rotation between the drive plate 25 and the driven plate 26 is increased greater than a predetermined angle, each of the protrusions 32 is individually brought into contact to a connection means 33 connecting the first drive plate 25A and the second drive plate 25B thereby restricting the relative rotation between the drive plate 25 and the driven plate 26. Thus, the protrusions 32 and the connection means 33 serve as stoppers. An inner circumferential portion of the driven plate 26 is fixed to the above-mentioned turbine hub 12 by rivets. External teeth are formed on the outer circumference of the driven plate 26 between the protrusions 32 so that the driven plate 26 serves as the above-mentioned sun gear 20. A cross-section of the torsional vibration damper 1 in the axial direction is shown in FIG. 3 in an enlarged scale. As can be seen from FIG. 3, a thickness of the pinion gear 22 is thickest in the gears of the planetary gear unit 19. A thickness of the ring gear 21 is thinner than the thickness of the pinion gear 22, and a thickness of the sun gear 20 is thinner than the thickness of the ring gear 21.

Thus, the torsional vibration damper 1 damps the torsional vibrations by the planetary gear unit 19. According to the exemplary embodiment of the present disclosure, the planetary gear unit 19 may be manufactured in such a manner as to engage the gears homogeneously to one another for the purpose of limiting damage on the gears, while reducing a manufacturing cost and a manufacturing time.

Figure 4:
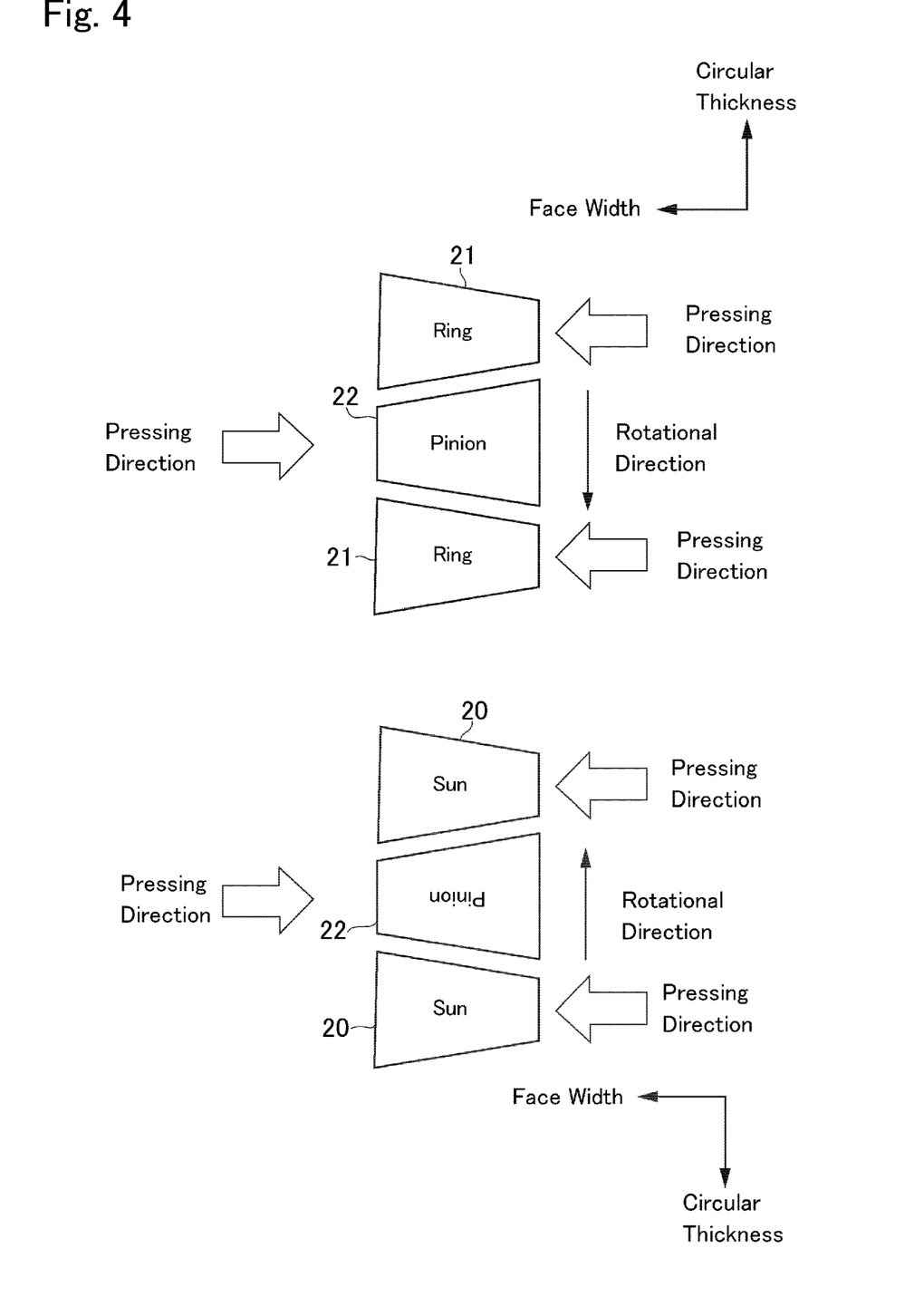
FIG. 4 is a pattern illustration showing a first example of the present disclosure.

In order to reduce the manufacturing cost and the manufacturing time of the planetary gear unit 19, according to the exemplary embodiment of the present disclosure, at least one of the gears of the planetary gear unit 19 are manufactured by a stamping method (i.e., by a press forming). However, the press forming method is not as accurate as a cutout method. For example, as a result of forming the gear by the press forming method, a thickness of each tooth of the gear in a punch side is reduced, or corners of each tooth of the gear in the punch side are rounded inevitably. That is, in the gear formed by the press forming method, a thickness of each tooth in the punch side is thinner than that in the die side. In other words, a thickness of each tooth of the gear formed by the press forming method is varied in a direction of face width (i.e., in a direction of a line of contact). For example, such dimensional error in the gear teeth may be eliminated by grinding the gear teeth, but a manufacturing cost and a manufacturing time will be increased by executing the grinding on the gear. According to the exemplary embodiment of the present disclosure, therefore, the gears of the planetary gear unit 19 are mated to one another taking account of such dimensional errors in the gear teeth resulting from forming the gear(s) by the press forming method. Specifically, the gears of the planetary gear unit 19 are mated to one another in such a manner as to contact the teeth of one of the gears homogeneously to the adjacent teeth of another gears. In other words, the gears of the planetary gear unit 19 are mated to one another in such a manner as to contact a thinner portion of each tooth to a thicker portion of the adjacent teeth. Turning to FIG. 4, there is shown a first example of the planetary gear unit 19 according to the present disclosure. According to the first example, the sun gear 20, the ring gear 21, and the pinion gears 22 of the planetary gear unit 19 are manufactured by the press forming method.

Figure 5:
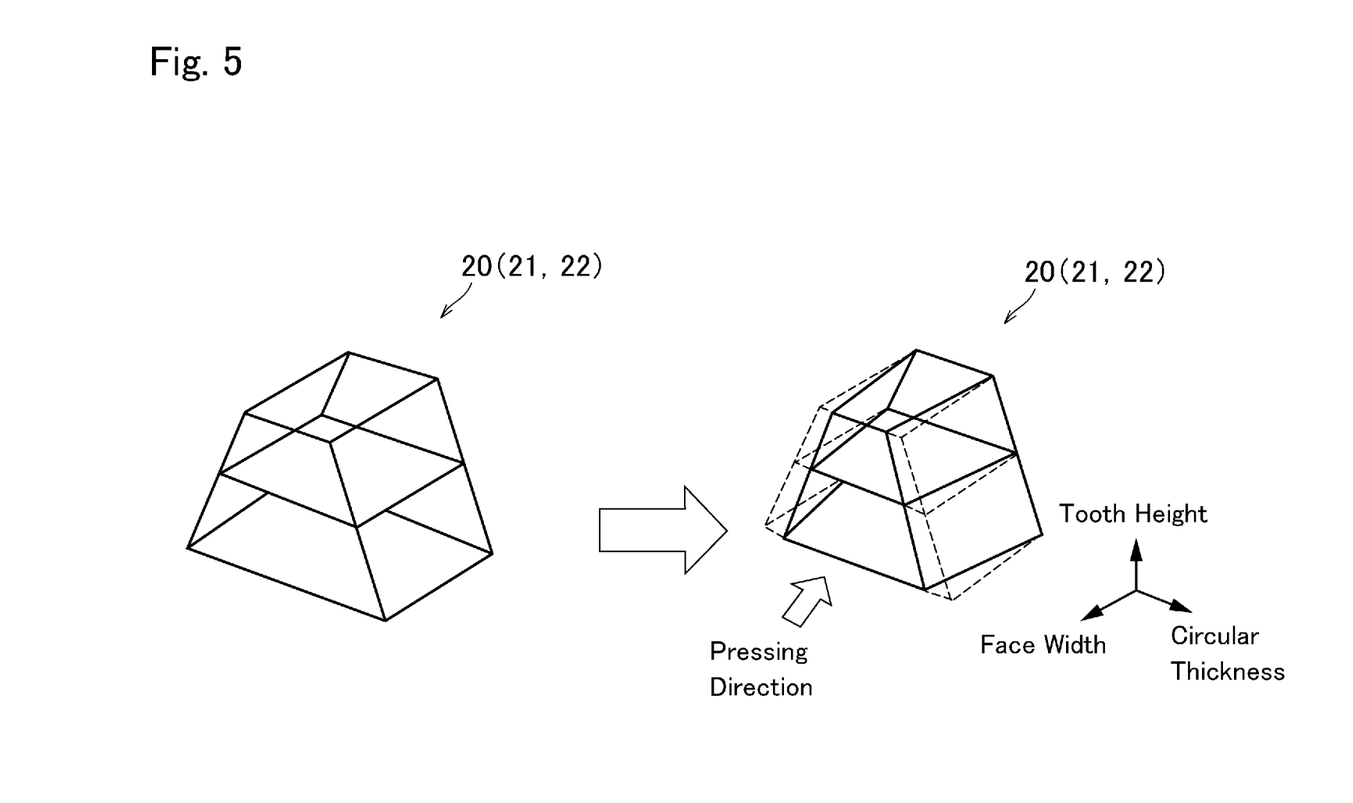
FIG. 5 is a transparent view showing one example of a dimensional error in the gear formed by the press forming method.

One example of the above-explained dimensional error in the teeth of the gear formed by the press forming method is shown in FIG. 5. In FIG. 5, the left transparent view shows designed dimensions of the tooth of the sun gear 20 (or the ring gear 21, or the pinion gear 22) of the planetary gear unit 19, and the right transparent view shows actual dimensions of the tooth of the sun gear 20 (or the ring gear 21, or the pinion gear 22) formed by the press forming method. As illustrated by the solid lines in the right transparent view, as a result of forming e.g., the sun gear 20 by the press forming method, a thickness of a tooth of the sun gear 20 in the punch side is reduced from the designed thickness illustrated by the dashed line. In other words, a thickness of a tooth of the sun gear 20 at a press-starting end in a pressing direction is reduced thinner than the thickness at a press-termination end in the pressing direction. That is, the press-termination end of each tooth of the sun gear 20 may be formed to have a thickness substantially identical to a designed thickness. If, e.g., the sun gear 20 formed by the press forming method is engaged with another gear also formed by the press forming method without taking account of orientations of the gear teeth of those gears, the gear teeth of those gears may not be contacted homogeneously and properly to one another. In order to contact the teeth of the gears formed by the press forming method homogeneously to the teeth of the fellow gears, according to the first example, one of the gears is engaged with the other two gears in such a manner that the press-starting end in the pressing direction in which a thickness of each tooth is reduced individually is oriented opposite to the press-starting ends of the other two gears.

Specifically, as shown in FIG. 4, each of the pinion gears 22 is engaged with the sun gear 20 and ring gear 21 in an orientation in which a thickness of each tooth gets thinner in a direction opposite to a direction in which each tooth of the sun gear 20 and the ring gear 21 gets thinner. In other words, each of the pinion gear 22 is engaged with the sun gear 20 and ring gear 21 in an orientation in which the press-starting end thereof in the pressing direction is oriented opposite to the press-starting ends of the sun gear 20 and the ring gear 21 in the pressing direction. As described, according to the first example, all of the sun gear 20, the ring gear 21, and the pinion gears 22 of the planetary gear unit 19 are manufactured by the press forming method. Consequently, each tooth of those gears 20, 21, and 22 is individually reduced or rounded at the press-starting end in the pressing direction due to material migration or residual stress, but the press-termination end of each tooth of those gears 20, 21, and 22 may be formed to have a designed thickness respectively. According to the first example, therefore, the pinion gears 22 are engaged with the sun gear 20 and the ring gear 21 in the opposite orientation to the sun gear 20 and the ring gear 21 so as to contact each tooth of the pinion gears 22 homogeneously to each tooth of the sun gear 20 and the ring gear 21. In other words, a thinner portion of each tooth of the pinion gears 22 is individually contacted to the thicker portions of adjacent tooth of the sun gear 20 and the ring gear 21.

Here, it is to be noted that the explanations of the examples of the present disclosure are made on the basis that the reduction in the tooth thickness of each gear is similar to one another. In addition, although the gears of the planetary gear unit 19 is illustrated as spur gears, the present disclosure may also be applied to a helical gear. In FIG. 4, a rotational direction of the pinion gear 22 with respect to the sun gear 20 and a rotational direction of the pinion gear 22 with respect to the ring gear 21 are indicated by the arrows.

Thus, according to the first example, each of the pinion gears 22 is engaged with the sun gear 20 and ring gear 21 in an orientation in which a thickness of each tooth gets thinner in the direction opposite to the direction in which each tooth of the sun gear 20 and the ring gear 21 gets thinner. According to the first example, therefore, each tooth of the pinion gears 22 can be contacted homogeneously to each tooth of the sun gear 20 and the ring gear 21.

If the gears formed by the press forming method are engaged to one another without taking account of the orientations of the gears, the teeth of those gears are contacted unevenly to one another. That is, a contact pressure between the tooth of one of the gears and the tooth of the fellow gear is locally increased, and consequently, the teeth of the gears engaged with each other may be damaged and worn at a specific point. By contrast, according to the first example, each tooth of the pinion gears 22 can be contacted homogeneously and properly not only to each tooth of the sun gear 20 but also to each tooth of the ring gear 21. According to the first example, therefore, damages on the sun gear 20, the ring gear 21, and the pinion gears 22 can be limited.

As explained with reference to FIG. 3, a thickness of the sun gear 20 in the axial direction is thinner than those of the ring gear 21 and the pinion gear 22, and hence the sun gear 20 is most suitable to be manufactured by the press forming method. In addition, configurations of the sun gear 20 are more complicated than those of the ring gear 21 and the pinion gear 22. Therefore, a manufacturing cost and a manufacturing time of the planetary gear unit 19 can be reduced significantly by forming the sun gear 20 by the press forming method. Further, since number of teeth of the ring gear 21 is large, the manufacturing cost and the manufacturing time of the planetary gear unit 19 may be further reduced by forming the ring gear 21 by the press forming method.

Second Example

Figure 6:
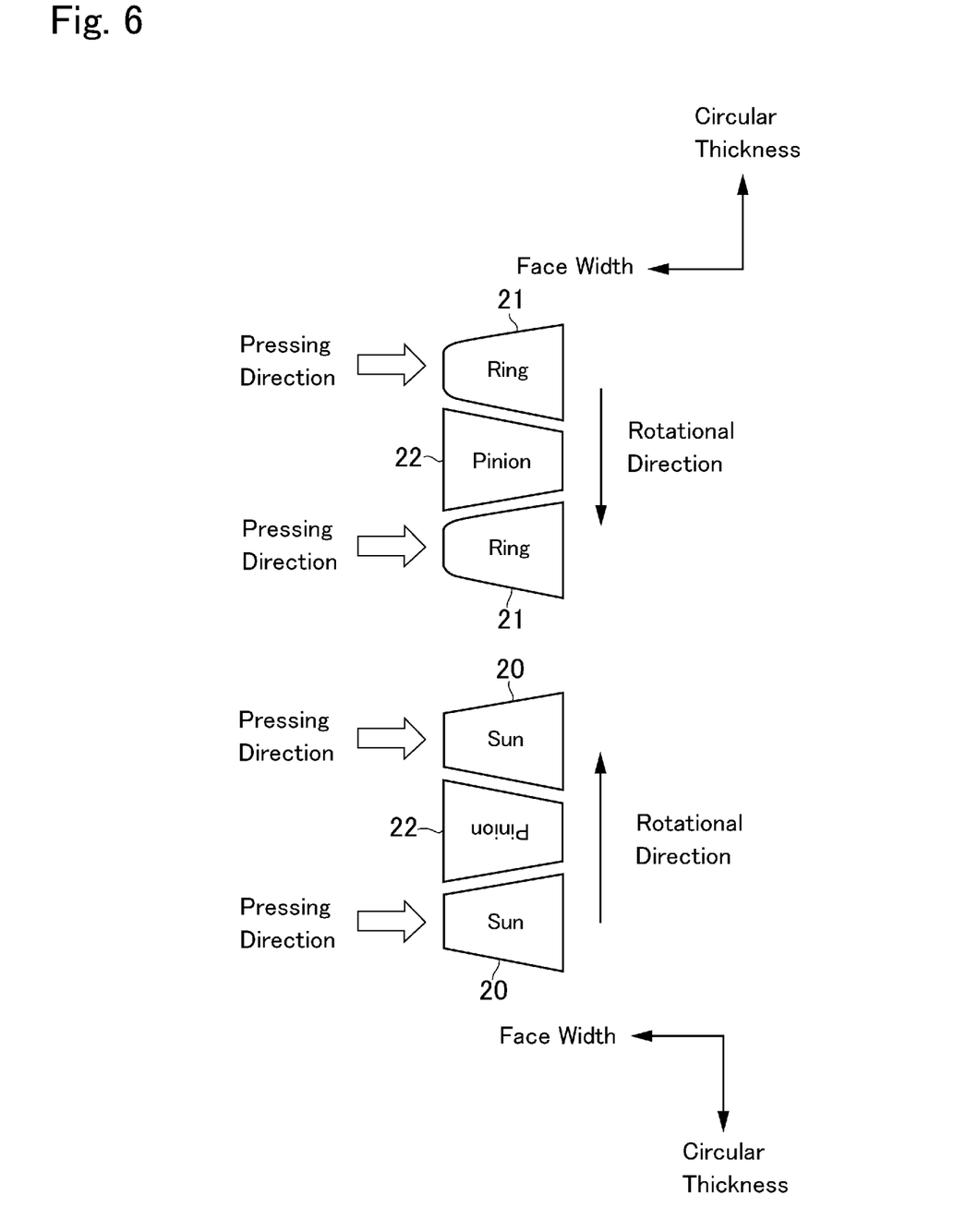
FIG. 6 is a pattern illustration showing a second example of the present disclosure.

According to the present disclosure, only a predetermined gear of the planetary gear unit 19 may be formed by the press forming method, and the remaining gears of the planetary gear unit 19 may be formed by the cutout method. Turning to FIG. 6, there is shown a second example of the present disclosure in which only the pinion gears 22 are formed by the cutout method, and the sun gear 20 and the ring gear 21 are formed by the press forming method.

According to the second example, specifically, each of the pinion gears 22 is formed individually by the cutout method in such a manner that each tooth of the pinion gear 22 is thinned toward one side in the axial direction to be contacted homogeneously to each tooth of the sun gear 20 and the ring gear 21 formed by the press forming method. Each of the pinion gears 22 thus formed by the cutout method is engaged with the sun gear 20 and ring gear 21 in an orientation in which a thickness of each tooth gets thinner in a direction opposite to the direction in which each tooth of the sun gear 20 and the ring gear 21 gets thinner. In other words, each of the pinion gear 22 is engaged with the sun gear 20 and ring gear 21 in an orientation in which one end of each tooth in the face width direction is thinned is oriented opposite to the press-starting ends of the sun gear 20 and the ring gear 21 in the pressing direction.

According to the second example, therefore, each tooth of the pinion gears 22 formed by the cutout method can be contacted homogeneously to each tooth of the sun gear 20 and the ring gear 21 formed by the press forming method. For this reason, damages on the sun gear 20, the ring gear 21, and the pinion gears 22 may also be limited, and hence damages of the planetary gear unit 19 can be limited.

Third Example

Figure 7:
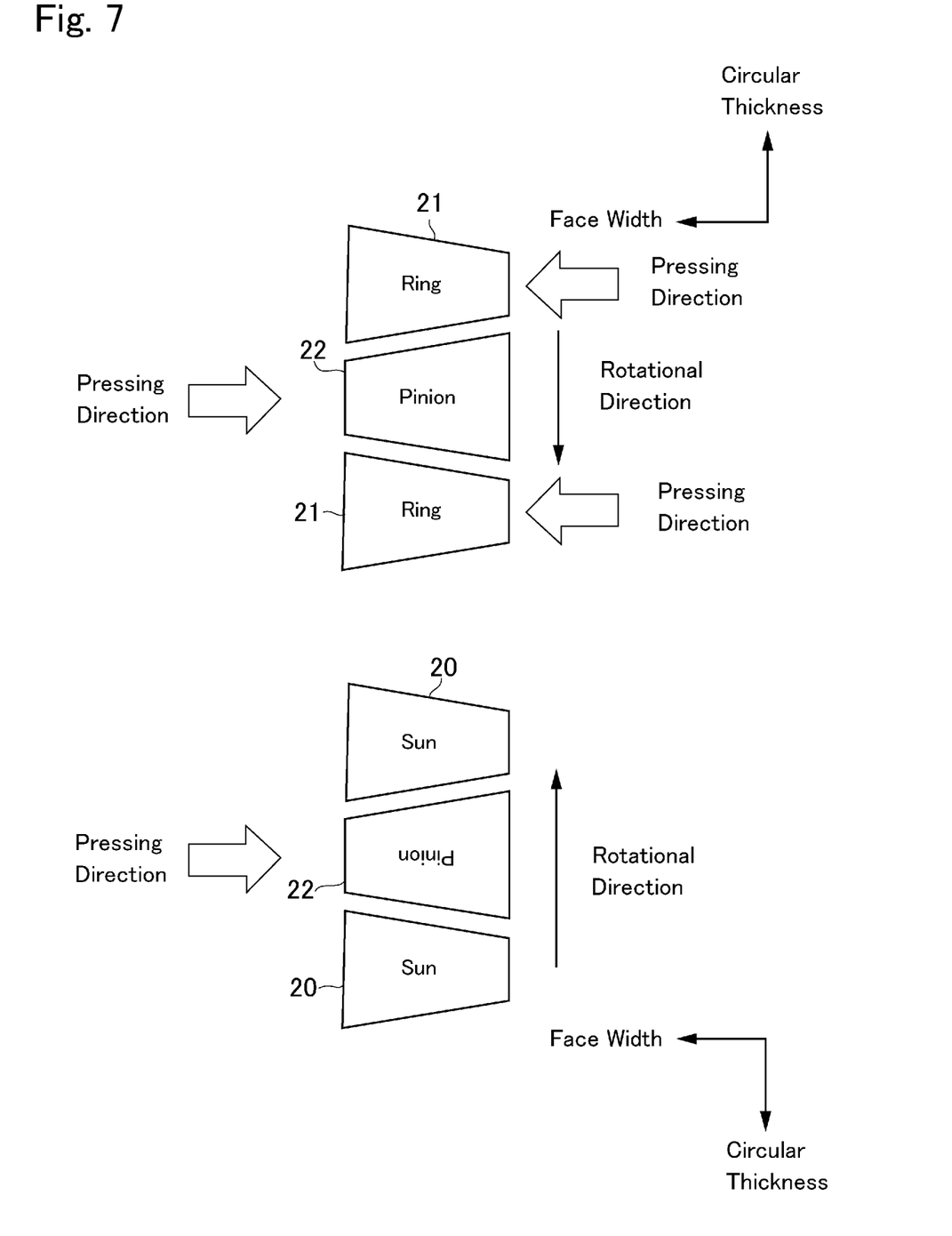
FIG. 7 is a pattern illustration showing a third example of the present disclosure.

Turning to FIG. 7, there is shown a third example of the present disclosure in which only the sun gear 20 is formed by the cutout method, and the ring gear 21 and the pinion gears 22 are formed by the press forming method. According to the third example, specifically, the sun gear 20 is formed by the cutout method so that each tooth of the sun gear 20 is thinned toward one side in the face width direction to be contacted homogeneously to each tooth of the pinion gears 22 and the ring gear 21 formed by the press forming method. The sun gear 20 thus formed by the cutout method is engaged with the pinion gears 22 in an orientation in which a thickness of each tooth gets thinner in a direction opposite to a direction in which each tooth of the pinion gears 22 gets thinner, and the ring gear 21 is engaged with the pinion gears 22 in an orientation in which a thickness of each tooth gets thinner in a direction opposite to a direction in which each tooth of the pinion gears 22 gets thinner. According to the third example, therefore, the above-explained advantages of the foregoing examples may also be achieved.

Fourth Example

Figure 8:
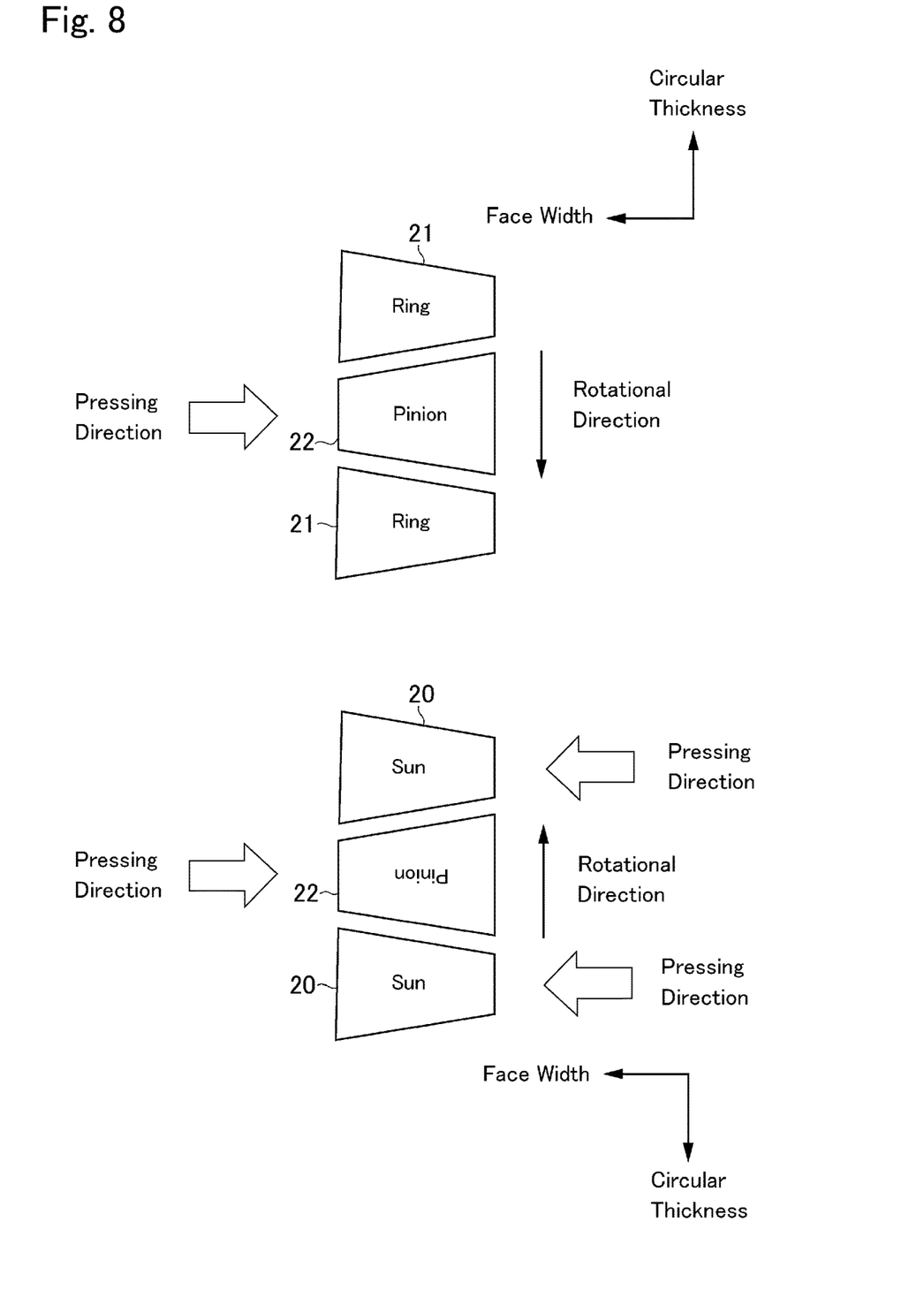
FIG. 8 is a pattern illustration showing a fourth example of the present disclosure.

Turning to FIG. 8, there is shown the fourth example in which only the ring gear 21 is formed by the cutout method, and the sun gear 20 and the pinion gears 22 are formed by the press forming method. According to the fourth example, specifically, the ring gear 21 is formed by the cutout method in such a manner that each tooth of the sun gear 20 is thinned toward one side in the face width direction to be contacted homogeneously to each tooth of the pinion gears 22 and the sun gear 20 formed by the press forming method. The ring gear 21 thus formed by the cutout method is engaged with the pinion gears 22 in an orientation in which a thickness of each tooth gets thinner in a direction opposite to a direction in which each tooth of the pinion gears 22 gets thinner, and the sun gear 20 is engaged with the pinion gears 22 in an orientation in which a thickness of each tooth gets thinner in a direction opposite to a direction in which each tooth of the pinion gears 22 gets thinner. According to the fourth example, therefore, the above-explained advantages of the foregoing examples may also be achieved.

Next, here will be explained a manufacturing method of the planetary gear unit 19 according to the present disclosure. First of all, at least one of the sun gear 20, the ring gear 21, and the set of the pinion gears 22 is formed by pressing a metallic material by the press forming method, that is, by pressing the metallic material by moving the punch toward the die in the face width direction. Then, in the case that not all of the sun gear 20, the ring gear 21, and the set of the pinion gears 22 are formed by the press forming method, the remaining gear(s) is/are formed by e.g., the cutout method in such a manner that each gear tooth is thinned toward one side in the face width direction. Thereafter, the sun gear 20 and the ring gear 21 are set such that the end surfaces in which a thickness of each tooth is thinned are oriented in the same direction, and the pinion gears 22 are engaged with the sun gear 20 and the ring gear 21 in the orientation in which a thickness of each tooth gets thinner in a direction opposite to a direction in which each tooth of the sun gear 20 and each tooth of the ring gear 21 gets thinner. In other words, the pinion gears 22 are engaged with the sun gear 20 and the ring gear 21 in such a manner that a thinner portion of each tooth of the pinion gears 22 is individually contacted to a thicker portion of the adjacent teeth of the sun gear 20 and the ring gear 21.

For example, according to the first example shown in FIG. 4, all of the sun gear 20, the ring gear 21, and the set of the pinion gears 22 are formed by the press forming method. In this case, for example, the sun gear 20 is formed by the press forming method, and the ring gear 21 and the set of the pinion gears 22 are also formed by the press forming method sequentially in desired order. At this step, the set of the pinion gears 22 may be formed by pressing the metallic material by the punch in an opposite direction to a direction to press the metallic material by the punch to form the sun gear 20 and the ring gear 21. Thereafter, the sun gear 20 and the ring gear 21 are set such that the end surfaces in which a thickness of each tooth is thinned are oriented in the same direction, and the pinion gears 22 are engaged with the sun gear 20 and the ring gear 21 in the orientation in which a thickness of each tooth gets thinner in a direction opposite to the direction in which each tooth of the sun gear 20 and each tooth of the ring gear 21 gets thinner. In other words, the pinion gears 22 are engaged with the sun gear 20 and the ring gear 21 in such a manner that the thinner portion of each tooth of the pinion gears 22 is individually contacted to the thicker portion of the adjacent teeth of the sun gear 20 and the ring gear 21.

As described, according to the second to fourth examples shown in FIGS. 6 to 8, at least any one of the sun gear 20, the ring gear 21, and the set of the pinion gears 22 is/are formed by the press forming method. In those cases, the remaining gear(s) of the planetary gear unit 19 is/are formed by the cutout method to be fitted to the actual dimensions of the gear formed by the press forming method, and the pinion gears 22 are engaged with the sun gear 20 and the ring gear 21 in the above-explained manner.

According to the manufacturing method of the present disclosure, therefore, each tooth of the pinion gears 22 can be contacted homogeneously not only to each tooth of the sun gear 20 but also to each tooth of the ring gear 21. According to the manufacturing method of the present disclosure, therefore, damages on the sun gear 20, the ring gear 21, and the pinion gears 22 can be limited. In addition, backlash between the gears can be reduced. For this reason, vibration damping performance of the torsional vibration damper 1 can be ensured.

Although the above exemplary embodiments of the present disclosure have been described, it will be understood by those skilled in the art that the present disclosure should not be limited to the described exemplary embodiments, and various changes and modifications can be made within the scope of the present disclosure. For example, in the planetary gear unit 19, only the ring gear 21 may be formed by the press forming method, and the sun gear 20 and the pinion gears 22 may be formed by the cutout method. Further, only the sun gear 20 may be formed by the press forming method, and the ring gear 21 and the pinion gears 22 may be formed by the cutout method. Furthermore, only the pinion gears 22 may be formed by the press forming method, and the sun gear 20 and the ring gear 21 may be formed by the cutout method.

Figure 9:
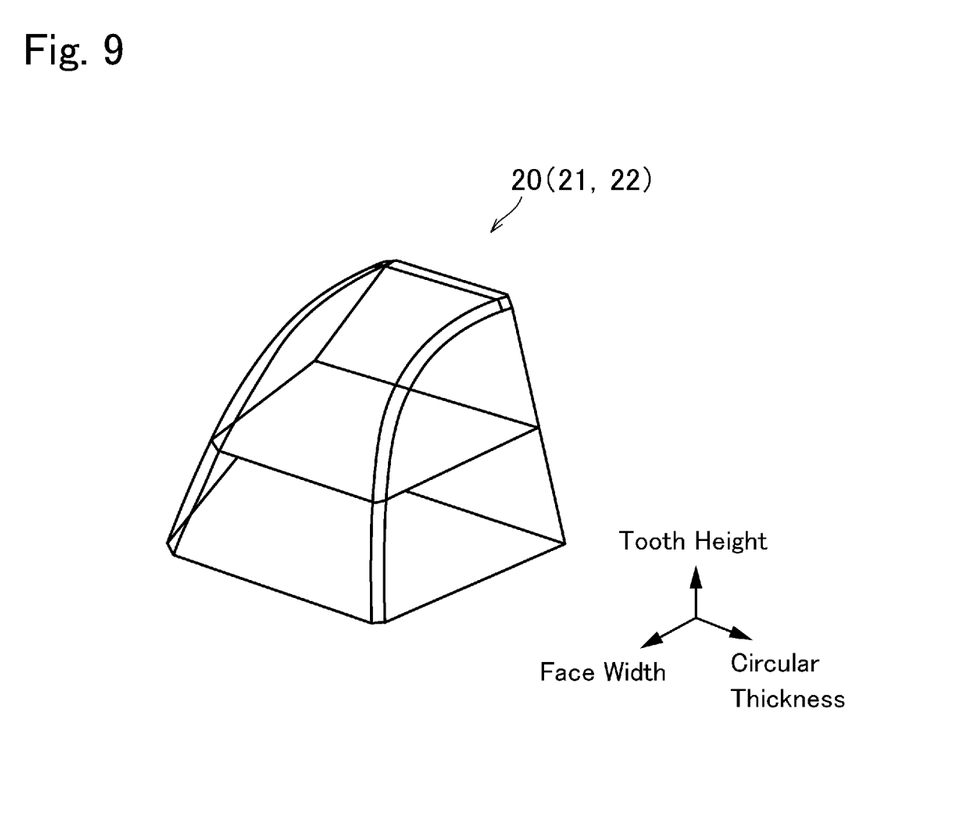
FIG. 9 is a transparent view showing another dimensional error in the gear formed by the press forming method.
Figure 10:
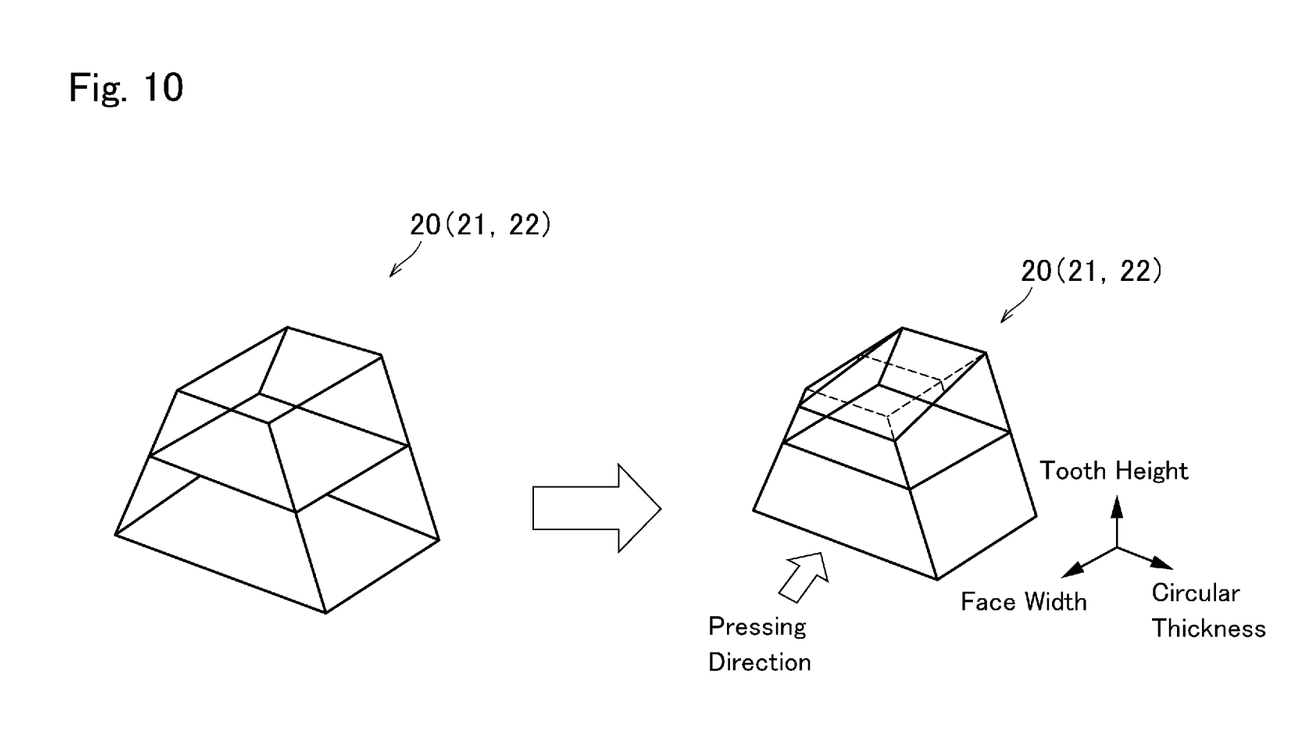
FIG. 10 is a transparent view showing a dimensional error in a height direction of the gear formed by the press forming method.
Figure 11:
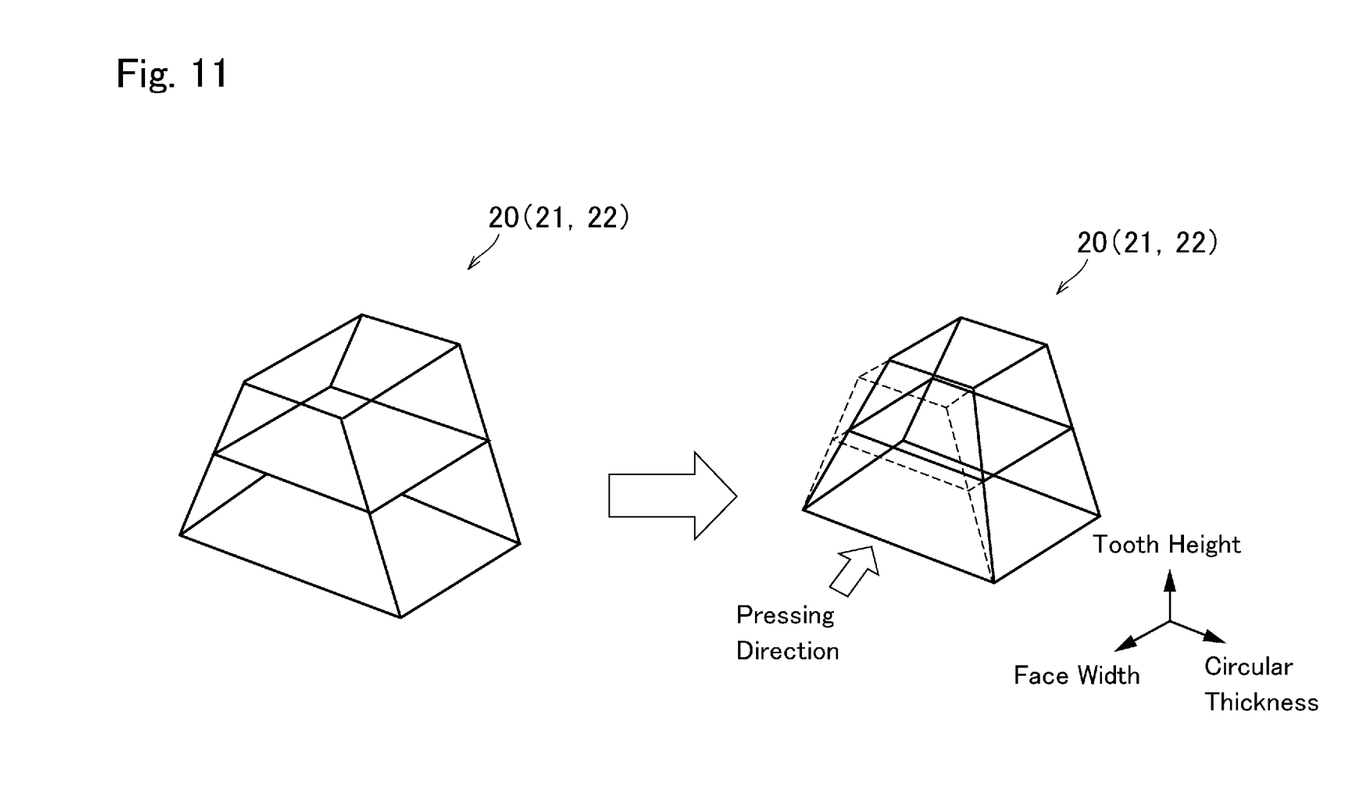
FIG. 11 is a transparent view showing a dimensional error in a face width direction of the gear formed by the press forming method.

In addition, as a result of forming the gear by the press forming method, the gear tooth may be reduced or rounded at a part not only in the direction of the circular thickness. For example, as illustrated in FIG. 9, a tooth height and a face width of the gear tooth may be reduced from the designed dimensions. Specifically, as illustrated by the solid lines in the right transparent view in FIG. 10, as a result of forming e.g., the sun gear 20 by the press forming method, a height of a tooth of the sun gear 20 in the punch side is reduced from the designed height illustrated by the dashed line. Likewise, as illustrated by the solid lines in the right transparent view in FIG. 11, as a result of forming e.g., the sun gear 20 by the press forming method, a face width of a tooth of the sun gear 20 in the punch side is reduced from the designed width illustrated by the dashed line. In those cases, the pinion gears 22 are formed by the cutout method to be fitted to the actual dimensions of the sun gear 20 formed by the press forming method, and the ring gear 21 is formed by the cutout method to be fitted to the finished dimensions of the pinion gears 22. In addition, the manufacturing method according to the present disclosure may also be applied to a helical gear. Further, the manufacturing method according to the present disclosure may also be applied to assemble a planetary gear unit in which a carrier serves as an output element or an inertia element, and a ring gear serves as an input element or an output element. Furthermore, the manufacturing method according to the present disclosure may also be applied to assemble not only a single-pinion planetary gear unit but also a double-pinion planetary gear unit.

What is claimed is:
1. A torsional vibration damper, comprising:
   a planetary gear unit including
      a sun gear,
      a ring gear arranged concentrically around the sun gear,
      a plurality of planetary pinion gears interposed between the sun gear and the ring gear to transmit a torque to at least one of the sun gear and the ring gear, and
      a carrier supporting the pinion gears in a rotatable manner,
   wherein one of the sun gear, the ring gear, and the carrier serves as an input element to which a torque is delivered from an engine,
   another one of the sun gear, the ring gear, and the carrier serves as an output element that outputs the torque,
   still another one of the sun gear, the ring gear, and the carrier serves as an inertia element that rotates relatively to the input element and the output element, the input element and the output element are connected to each other through an elastic member so that the input element and the output element are rotated relatively to each other while deforming the elastic member by a pulsation of the torque of the engine, the inertia element is oscillated by the pulsation of the torque of the engine, a thickness of each tooth of each of the sun gear, the ring gear, and the planetary pinion gears is varied respectively in a direction of face width, and the sun gear, the ring gear, and the planetary pinion gears are engaged to one another so that a thinner portion of each tooth is individually engaged with a thicker portion of the adjacent teeth.

2. The torsional vibration damper as claimed in claim 1, wherein at least one of the sun gear, the ring gear, and the planetary pinion gears is/are formed by a press forming method.

3. The torsional vibration damper as claimed in claim 2, wherein at least the planetary pinion gears are formed by the press forming method.

4. The torsional vibration damper as claimed in claim 2, wherein at least the sun gear is formed by the press forming method.

5. The torsional vibration damper as claimed in claim 2, wherein at least the ring gear is formed by the press forming method.

6. The torsional vibration damper as claimed in claim 2, wherein the sun gear, the ring gear, and the planetary pinion gears are formed by the press forming method.

7. A manufacturing method of a torsional vibration damper comprising:

a planetary gear unit including a sun gear, a ring gear arranged concentrically around the sun gear, a plurality of planetary pinion gears interposed between the sun gear and the ring gear to transmit a torque to at least one of the sun gear and the ring gear, and a carrier supporting the pinion gears in a rotatable manner, wherein one of the sun gear, the ring gear, and the carrier serves as an input element to which a torque is delivered from an engine, another one of the sun gear, the ring gear, and the carrier serves as an output element that outputs the torque, still another one of the sun gear, the ring gear, and the carrier serves as an inertia element that rotates relatively to the input element and the output element, the input element and the output element are rotated relatively to each other while deforming an elastic member interposed therebetween by a pulsation of the torque of the engine, the inertia element is oscillated by the pulsation of the torque of the engine, the manufacturing method comprising:

forming at least one of the sun gear, the ring gear, and the planetary pinion gears by a press forming method in which a forming tool is moved in a direction of face width;

forming the remaining gear(s) such that each tooth is thinned toward one side of the gear(s); and thereafter engaging the gear formed by the press forming method with the remaining gear(s) such that a thinner portion of each tooth is individually contacted to a thicker portion of the adjacent teeth of the remaining gear(s).

8. The manufacturing method of the torsional vibration damper as claimed in claim 7, wherein the remaining gear(s) is/are formed by a cutout method.

* * * * *